United States Patent Office 2,823,959
Patented Feb. 18, 1958

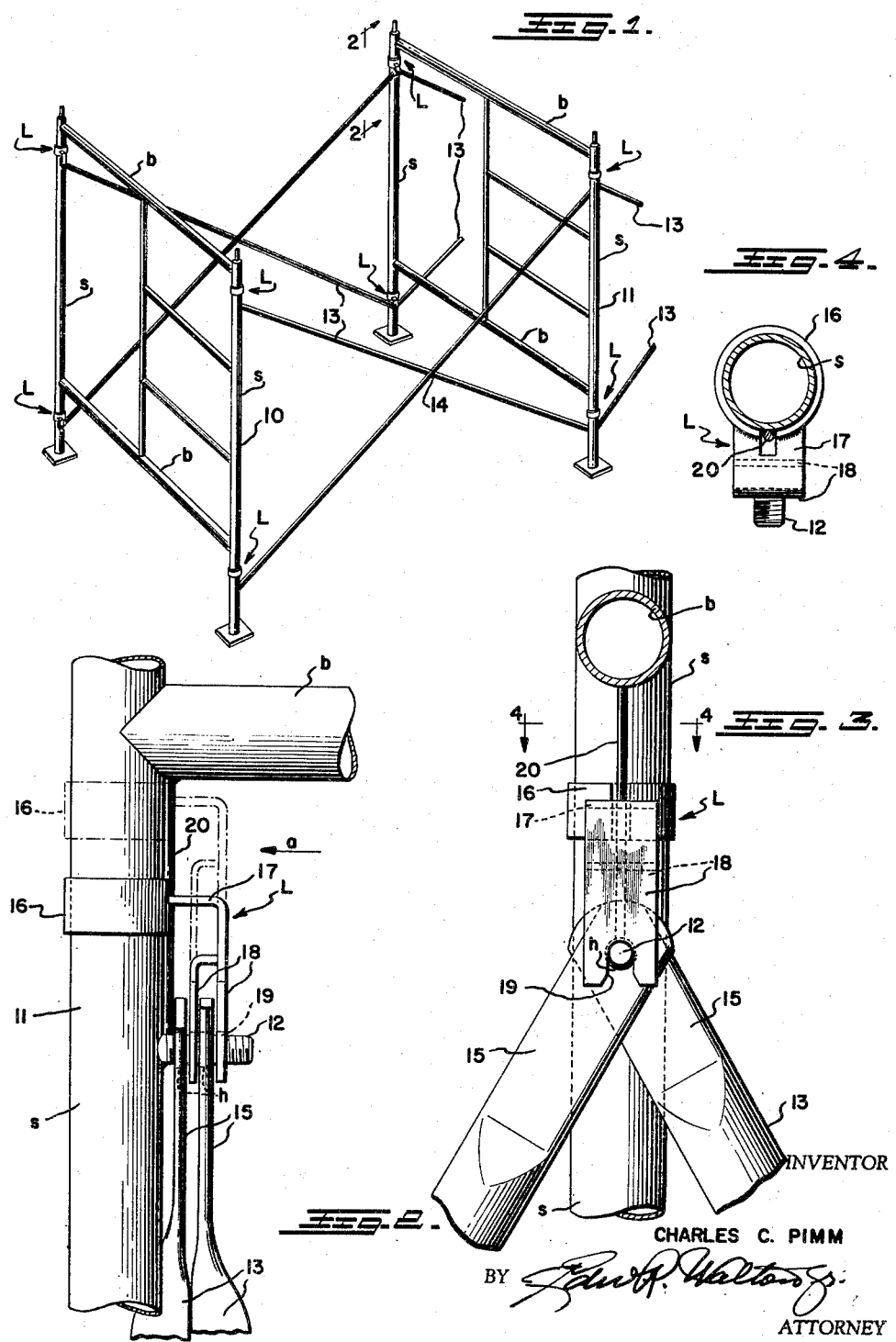

2,823,959

LOCKING DEVICE FOR SCAFFOLD ELEMENTS

Charles C. Pimm, West Somerville, Mass.

Application December 21, 1955, Serial No. 554,474

2 Claims. (Cl. 304—40)

The present invention relates to improved locking means for quickly maintaining in place and releasing assembled structural members or parts as, for instance, of demountable scaffolding, in connection with which the present invention is illustrated and described for convenience as one application of the invention.

Heretofore, structural elements arranged in close association to form supports, and the like, have been held or joined together with clamps or with bolts or studs and nuts, when it has been desired to provide a "knock-down" or demountable structure. The application and removal of clamps and of nuts and bolts is time-consuming and laborious in addition to their becoming lost or damaged beyond repair.

More recently, other quickly actuated lock means have been suggested in the form of an inverted U-shaped member having an elongated slot in one leg thereof to receive and slide on a stud, projecting from a structural part, and its other leg receivable in a slot in the stud, the other structural part or parts to be joined to the stud being received between said legs.

The object of the invention is to provide an improved locking device, of the type last mentioned, wherein the locking device is carried by and slidable on one structural part itself, instead of upon the stud, thereby imposing no stresses or strains upon the stud itself and not requiring the stud to be grooved or slotted to receive or coact therewith, and, when in its locking position, acts to brace the stud from said structural part.

Another object is to arrange the locking device upon the structural part carrying it, so it may be moved entirely away from and free of the stud, projecting laterally from said structural part, and allow unhindered application of other structural parts to said stud and, when released, will gravitate to locking position and lock the structural members, on the stud, in position thereon, without the need of further manipulation.

A further object of the invention is to provide the locking device with two or more spaced and substantially parallel locking members which straddle the stud along its length and provide separate confining areas to be occupied by each structural part, respectively, to be attached to the stud, thereby restricting the attached structural parts against undue play or movement axially of the stud.

A still further object is to provide such a locking device which is very simple in construction and inexpensive to manufacture, and which becomes a permanent non-detachable part of a structural element to insure against its loss, and which is durable and efficacious in use, while at the same time permitting associated structural parts to be locked together in the heretofore conventional manner, when desired, by nuts threaded on a stud.

The above and other objects, and the advantages therefor, are attained by the structure more fully set forth in the following description in connection with the accompanying drawings, which show the preferred embodiment of the invention as at present constructed and used and in which:

Figure 1 is a perspective view of a scaffold structure equipped with the locking devices of the present invention;

Figure 2 is an enlarged fragmentary view illustrating in elevation a standard of a scaffolding end-frame, looking in the direction of line 2—2 of Figure 1;

Figure 3 is an elevational view similar to Figure 2 and looking in the direction of the arrow A of Figure 2; and Figure 4 is a transverse sectional view taken substantially on line 4—4 of Figure 3.

Referring in detail to the drawings, in which like characters of reference refer to similar parts throughout the several views, Figure 1 partially illustrates a metallic scaffold structure, of the knock-down type, comprising a pair of conventional end-frames 10 and 11, each end-frame comprising a pair of standards $s$ held in substantially parallel spaced relation and connected by brace members $b$.

As is common practice, each of the standards $s$ is provided with laterally extending threaded studs 12 having their inner ends connected to the standard $s$ in any suitable manner, such as by welding or threading the same in threaded holes, or both, one of said studs being provided adjacent the upper and lower end portions of each standard, respectively, and preferably on the inner side of the standard remote from the brace member $b$, as shown particularly in Figures 2 and 3. The end-frames, when placed in vertical spaced relation as shown in Figure 1, are held in said relation by cross bracings 13 extending between adjacent standards of adjacent end frames, as illustrated in Figure 1. The cross bracing 13 on each side of a pair of end frames consists of two rods diagonally positioned with respect to each other to form substantially the figure X, and may or may not be pivoted together at their crossing point, indicated at 14. The ends of the rods 13 are usually flattened, as indicated at 15, and these flattened portions are provided with an aperture or hole $h$ dimensioned to have the threaded stud 12 slidably extend therethrough. The prevalent prior practice has been to clamp these cross bracing ends 15 on the stud 12 by bolt-nuts of one type or another.

The improvement of the present invention resides in the provision of a locking device L in association with each of the studs 12 on the standards $s$ and slidably mounted on the standards $s$, preferably at a point above the stud, so that the lock members of said locking device may be raised upwardly to unlocking position with the locking members out of contact with and remote from the stud and may drop by gravity from unlocking position into locking position.

To this end, each locking device L comprises a ring or collar 16 which may be in the form of a split ring, as shown more particularly in Figures 3 and 4, freely slidable on and embracing a standard $s$ without undue loose play. The ring or collar 16 has laterally projecting therefrom an arm 17 to overlie the stud 12 with which it is associated. The arm 17 is formed to provide one or more lock members 18 extending downwardly therefrom in substantially spaced relation. The lock members 18 are preferably in the form of elongated plates lying in planes extending substantially at right-angles to the axis of the stud 12 and have their distal ends notched or bifurcated, as at 19, to straddle and, preferably, extend below the stud 12. The spacing between the lock members or plates 18 is dimensioned to divide the area between the outer plate 18 and the standard $s$ so as to receive in each division one of the flattened perforated ends 15 of the cross bracing 13, as illustrated in Figure 2. There may be as many plate-like lock members 18 as there will be cross bracings 13 receivable on the associated stud 12, two being shown in the present instance. Also, the inner plate or plates 18 may not extend directly from the arm 17, but may be connected to the outer plate 18, as indicated in Figure 2. By providing a plurality of locking members 18 between each of which the ends of the brace members 13 are to be located, considerable loss-movement axially of the stud is reduced or eliminated in the use of a locking device of the present kind, thus firmly holding the cross bracing 13 in position. If only one end of a cross brace 13 is to engage a stud 12, it is preferred that it be located between the standard s and the innermost lock member 18.

In order to assure that the locking device L will not rotate about the standard s and that the bifurcation 19 of the lock members will always be held in alignment with the stud 12, a suitable guide means is provided for the collar 16. This guide means may be an outstanding vertical rib 20 on the outer surface of the standard s extending for a distance, at least, the length of the slidable movement of the collar 16 thereon and may be provided by deforming the tubular member or by welding a rod to and longitudinally of the standard s, as indicated in Figures 3 and 4. In this connection, it is preferred, as shown, to place the guide rib 20 between the spaced split ends of the ring or collar 16 and to align the rib 20 perpendicularly with respect to the stud 12. The split ends of the collar 16 will be held in their spaced relation by the arm 17, which bridges said spaced ends and welded thereto.

In the use of the device above described, it is only necessary, when desiring to set up a scaffolding or the like, to place the end-frames 10 and 11 in spaced position and to connect them with the cross bracing 13 in the usual manner by slipping the holes h thereof over the studs 12. When connecting the cross bracing 13, the collar 16 of a locking device L is manually raised to the dotted line position shown in Figure 2, so that the locking plates 18 are raised clear of the stud 12, at which time the apertured end of a cross brace is slipped over the stud 12, as far as it will go on the stud, and, when the assembler releases the locking device, it gravitates downwardly into position. Should it be necessary to connect the end of the next adjacent cross bracing 13 to the same stud 12, the collar 16 is again manually slid upwardly on the standard s and an end of the second cross bracing 13 is slipped over the stud 12 to approximately juxtaposition with the end of the cross bracing 13 already on the stud, and then the locking device is allowed to drop into the position shown in Figures 2 and 3, thereby holding the cross bracing 13 onto the stud against axial movement thereof—all without the use of tools or other fastening elements.

Should it be desired at any time to employ a nut on a threaded stud 12, in lieu of the locking device L, it is only necessary to lift the locking device to its dotted line position and threadedly apply the nut to the stud 12.

It will be observed that the above stated objects are obtained by the locking device of the present invention which is simple and economical to produce and may be moved into and from locking position without the use of any tools, other than by an occasional tap of a hammer should the parts become stiff through long exposure to weather conditions, and that the studs 12 are not weakened by being slotted or circumferentially grooved as the support for the locking device L is upon the standard s itself. It will also be observed that the bifurcated ends of the lock-plate members 18 give lateral support to the stud along its length from the standard, when the members 18 are in locking position straddling said stud, against tensional pull and stresses applied thereto by the bracing rod 13, thus assisting to relieve such stresses from the point of connection of the stud with the standard that may cause such studs to break off and be deformed.

Having described the present invention in the manner in which the same is to be performed, it is to be understood that the invention is not to be limited to the exact structure shown and described, as the form may be varied within the scope of the appended claims.

That which is claimed, as new and to be secured by Letters Patent, is:

1. The combination with an elongated structural standard having a laterally projecting stud extending therefrom in spaced relation with an abutment on the standard, said stud being adapted to extend through an apertured structural brace element, of means for quickly locking said brace on said stud by gravity and releasing the same from locked position manually, said means comprising a collar in the form of a split ring surrounding said standard between said abutment and said stud for free to-and-fro limited slidable movement therebetween on said standard, said stud and abutment retaining said collar on the standard at all times, a plate secured to the collar and disposed in substantially parallel spaced relation with the said standard and having an extended end portion projecting below the plane of the collar and being bifurcated for a distance of its length to straddle the free end portion of said stud and to lie outwardly of and in opposition to the brace element on the stud to retain said brace, the split ends of said ring being separated, a guide rib carried by the standard extending longitudinally thereof and lying between the split ends of said ring to cooperate therewith for maintaining said plate at right angles to said stud and its bifurcated end in alignment with said stud.

2. The subject-matter of claim 1, characterized by the portion of said plate secured to said ring bridging said guide rib and permanently connecting said ends of the ring, whereby the ring is firmly held about the standard and against spreading.

References Cited in the file of this patent

UNITED STATES PATENTS

| | | |
|---|---|---|
| 1,058,608 | Lightly | Apr. 8, 1913 |
| 1,790,765 | Prow | Feb. 3, 1931 |
| 2,475,042 | McCloskey | July 5, 1949 |
| 2,686,086 | French | Aug. 10, 1954 |
| 2,716,576 | Nordone | Aug. 30, 1955 |
| 2,726,902 | Borgman et al. | Dec. 13, 1955 |